(12) United States Patent
Bohn, Jr.

(10) Patent No.: US 9,284,418 B2
(45) Date of Patent: Mar. 15, 2016

(54) GRAFTING FUNCTIONAL SPECIES TO RUBBER

(71) Applicants: Compagnie Generale des Etablissements Michelin, Clermont-Ferrand (FR); Michelin Recherche et Technique S.A., Granges-Paccot (CH)

(72) Inventor: Clayton C Bohn, Jr., Mauldin, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/654,319

(22) PCT Filed: Dec. 17, 2013

(86) PCT No.: PCT/US2013/075624
§ 371 (c)(1),
(2) Date: Jun. 19, 2015

(87) PCT Pub. No.: WO2014/099888
PCT Pub. Date: Jun. 26, 2014

(65) Prior Publication Data
US 2016/0009874 A1    Jan. 14, 2016

Related U.S. Application Data

(60) Provisional application No. 61/738,658, filed on Dec. 18, 2012.

(51) Int. Cl.
| | | |
|---|---|---|
| *C08F 255/06* | (2006.01) | |
| *C08F 4/28* | (2006.01) | |
| *C08F 36/00* | (2006.01) | |
| *C08J 3/20* | (2006.01) | |
| *C08L 13/00* | (2006.01) | |
| *C08C 19/04* | (2006.01) | |
| *C08C 19/08* | (2006.01) | |
| *B60C 1/00* | (2006.01) | |
| *C08L 7/00* | (2006.01) | |

(52) U.S. Cl.
CPC ............... *C08J 3/203* (2013.01); *B60C 1/0016* (2013.04); *C08C 19/04* (2013.01); *C08C 19/08* (2013.01); *C08L 7/00* (2013.01); *C08L 13/00* (2013.01); *C08J 2307/00* (2013.01); *C08L 2312/02* (2013.01)

(58) Field of Classification Search
CPC ........ C08C 19/06; C08F 253/00; C08L 51/04
USPC .................................. 525/315; 526/227, 335
See application file for complete search history.

(56) References Cited

U.S. PATENT DOCUMENTS

| | | | |
|---|---|---|---|
| 2,676,944 A | 4/1954 | Doak | |
| 6,797,783 B1 * | 9/2004 | Tanaka | .................... C08C 19/06 525/315 |
| 2011/0003932 A1 | 1/2011 | Steinhauser et al. | |

OTHER PUBLICATIONS

International Search Report with Written Opinion dated Apr. 19, 2014.

\* cited by examiner

*Primary Examiner* — William Cheung
(74) *Attorney, Agent, or Firm* — Frank J. Campigotto

(57) ABSTRACT

A method for producing a functionalized rubber that includes adding a diene rubber selected from natural rubber, a synthetic polyisoprene rubber or combinations thereof and an organic peroxide to a mixer, the organo peroxide may be represented by the formula $R_1$—O—O—$R_2$, wherein $R_1$ is selected from hydrogen or an organic moiety of between 4 and 15 carbon atoms and $R_2$ comprises a functional moiety. The mix composition may be mixed until the mix composition reaches a target temperature of between 120° C. and 190° C. and decomposing the organic peroxide to provide a decomposition product comprising the functional moiety and reacting at least a portion of the decomposition product with at least a portion of the diene rubber to produce the functionalized rubber.

20 Claims, No Drawings

GRAFTING FUNCTIONAL SPECIES TO RUBBER

This application is the U.S. National Stage of International Application No. PCT/US13/75624, filed on Dec. 17, 2013, which claims the benefit of earlier filed U.S. Provisional Application Ser. No. 61/738,658, filed on Dec. 18, 2012, the entire contents of which are incorporated herein by reference for all purposes.

BACKGROUND OF THE INVENTION

1. Field of the Invention

This invention relates generally to functionalized rubber and more specifically, to methods for functionalizing rubber elastomers and products made therefrom.

2. Description of the Related Art

The tire industry in recent years has been investing in research to improve the fuel economy of vehicles by reducing the rolling resistance of tires. One of the results of that research was to provide functionalized rubber products that when incorporated into the tire compositions used for making tire components does in fact reduce the rolling resistance of tires and thereby improve the fuel economy of trucks and cars.

In some rubber compositions useful for making tire components, it is known to use all or just a portion of such functionalized rubber for the manufacture of the tire components, the remainder of the rubber being non-functionalized.

Functionalized rubbers are known to be those that are appended with active moieties and they are well known in the rubber industry. The functionalization of the rubber may occur at the backbone of the elastomer and/or at the branch ends by attaching these active moieties to the polymer.

One example of a functionalized elastomer may be found in U.S. Pat. No. 6,013,718 that discloses a diene polymer that has been functionalized with a silanol functional group or a polysiloxane block having a single silanol end.

U.S. Pat. No. 6,503,973 discloses a functionalized elastomer that has been functionalized with a carboxylic acid function at one or at each of its chain ends.

U.S. Pat. No. 7,786,208 discloses functionalizing natural rubber latex by graft polymerization as an emulsion polymerization process.

While it is known that functionalized elastomers are useful in the rubber and tire industries, new methods of providing functionalized elastomers and new functionalized elastomers are still being sought to improve the physical characteristics of the rubber and to improve the performance of tires.

SUMMARY OF THE INVENTION

A method for producing a functionalized rubber that includes adding a diene rubber selected from natural rubber, a synthetic polyisoprene rubber or combinations thereof and an organic peroxide to a mixer. The organic peroxide may be represented by the formula $R_1$—O—O—$R_2$, wherein $R_1$ is selected from hydrogen or an organic moiety of between 4 and 15 carbon atoms and $R_2$ comprises a functional moiety selected from an amino, an amide, a hydroxyl, a sulfide, an epoxy, a tin-containing, an alkoxysilyl, a silanol, a carbonyl, a carboxyl, a thiocarbonyl, an ammonium, a nitrile, an imine functional moiety or combinations thereof. The method may further include mixing a mix composition comprising the diene rubber and the organic peroxide until the mix composition reaches a target temperature of between 120° C. and 190° C.

The method may further include decomposing the organic peroxide to provide a decomposition product comprising the carboxyl functional moiety and reacting at least a portion of the decomposition product with at least a portion of the diene rubber to produce the functionalized rubber.

The method may further include dropping the mix composition from the internal mixer and cooling the mix composition.

A tire component may comprise a rubber composition that is based upon a cross-linkable elastomer composition having, per 100 parts by weight of rubber (phr), between 5 phr and 100 phr of a functionalized elastomer produced by the method as described above and between 0 phr and 95 phr of an additional diene elastomer. Such cross-linkable rubber elastomer composition may further include a reinforcement filler and a vulcanization system.

A method for manufacturing a tire component may be included that provides mixing together components of a rubber composition into a non-productive mix, the components comprising between 5 phr and 100 phr of the functionalized elastomer produced by the method described above, between 0 phr and 95 phr of an additional diene elastomer and a reinforcement filler. The method may further include cooling the non-productive mix and mixing a vulcanization system into the non-productive mix to convert the non-productive mix to a productive mix. The method may further include forming the tire component from the productive mix.

DETAILED DESCRIPTION OF PARTICULAR EMBODIMENTS

Particular embodiments of the present invention include methods for in-situ functionalization of rubber, rubber compositions that include the functionalized rubber produced by such methods and useful articles manufactured from such rubber compositions.

Surprisingly it has been discovered that particular rubbers, namely natural rubber and synthetic polyisoprene rubber, can be functionalized by mixing it in an internal mixer with an organic peroxide that includes a functional moiety. When mixed together in the internal mixer, the heat generated during the mixing process causes the peroxide to decompose, forming a reactive radical that includes the functional moiety that then reacts with the rubber to produce the functionalized elastomer. It is noted that in particular embodiments of the in-situ functionalization methods disclosed herein the functionalization occurs in a mixer with dry rubber that is not a solution or emulsion process.

The success of the in-situ functionalization is indicated, in the examples that follow, by the improved hysteresis of the rubber compositions that include the functionalized elastomer produced by these methods.

As used herein, "diene elastomer" and "rubber" are synonymous terms and may be used interchangeably.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

As used herein, "phr" is a unit common in the rubber compounding industry that indicates the quantity of a component in a rubber composition as parts by weight per hundred parts by weight of the rubber in the composition.

Reference will now be made in detail to embodiments of the invention. Each example is provided by way of explanation of the invention. For example, features illustrated or described as part of one embodiment can be used with another embodiment to yield still a third embodiment. It is intended that the present invention include these and other modifications and variations.

The functionalized rubbers that are produced by the methods disclosed herein are useful for the manufacture of many types of articles that are made of rubber, including tire components, hoses, conveyor belts and so forth. Rubber compositions that include these functionalized rubbers are particularly useful for the manufacture of tire treads, undertreads, sidewalls, coatings of tire cords and/or reinforcements and other tire components.

The useful peroxides in accordance the methods disclosed herein may be represented by the formula $R_1$—O—O—$R_2$, wherein $R_1$ is selected from hydrogen or an organic moiety and $R_2$ comprises a functional moiety that, upon the decomposition of the peroxide, provides a decomposition product that reacts with a rubber elastomer to produce the functionalized rubber material.

The $R_1$ moiety is selected so that the peroxide will decompose at a convenient temperature, i.e., one that may be achieved during the mixing process of a rubber composition in a suitable mixer such as an internal mixer or an extruder. During the mixing process, the energy imposed on the rubber by the suitable mixer increases the temperature of the rubber. For example, in particular embodiments the rubber may reach temperatures of between 120° C. and 190° C. Typically the larger the $R_1$ moiety, the less reactive is the peroxide and the slower the rate of decomposition at a given temperature. Therefore, for particular embodiments of the methods disclosed herein, $R_1$ may be limited to between 1 and 15 carbon atoms or alternatively, between 4 and 15 carbon atoms, between 2 and 10 carbon atoms, between 2 and 8 carbon atoms, between 2 and 5 carbon atoms or between 3 and 10 carbon atoms. In particular embodiments, $R_1$ may be hydrogen.

The $R_1$ organic moiety is not particularly limited and may be selected from an alkyl group, a cycloalkyl group, an alkene group, an aryl group, an aromatic group, an alkaryl group, a vinyl group or combinations thereof. The alkyl group may be straight chained or branched. In particular embodiments, the group may be limited to saturated moieties. i.e., only single carbon-carbon bonds.

The $R_2$ portion of the peroxide comprises a functional moiety that functionalizes the rubber. The functionalization of the rubber provides the rubber with improved characteristics, often for example in the rubber's ability to interact with the filler added to a rubber composition. Functional moieties that are known to be useful in rubber include, for example, amino groups, amide groups, hydroxyl groups, sulfide groups, epoxy groups, tin-containing groups, alkoxysilyl groups, silanol groups, carbonyl groups, carboxyl groups, thiocarbonyl groups, ammonium groups, nitrile groups, imine groups and so forth. Therefore, $R_2$ may comprise, in particular embodiments, a functional moiety selected from an amino, an amide, a hydroxyl, a sulfide, an epoxy, a tin-containing, an alkoxysilyl, a silanol, a carbonyl, a carboxyl, a thiocarbonyl, an ammonium, a nitrile, an imine functional moiety or combinations thereof. Particular embodiments include the carboxyl functional moiety.

The $R_2$ portion may include, in addition to the functional moiety, additional organic structure to which the functional groups are attached. Such additional structure is not particular limiting and may include, for example, between 1 and 15 carbon atoms or alternatively, between and 4 and 15 carbon atoms, between 2 and 10 carbon atoms, between 2 and 8 carbon atoms, between 2 and 5 carbon atoms or between 3 and 10 carbon atoms. Likewise the additional organic structure is not particularly limited and may be selected from an alkyl group, a cycloalkyl group, an alkene group, an aryl group, an aromatic group, an alkaryl group, a vinyl group or combinations thereof. The alkyl group may be straight chained or branched. In particular embodiments, the group may be limited to having at least one double carbon-carbon bond.

In particular embodiments, the $R_1$ portion may also include a functional moiety and be similar to the description provided above as $R_2$. As such, particular embodiments may have both $R_1$ and $R_2$ comprising a functional moiety, wherein $R_1$ and $R_2$ may be the same or different and wherein both $R_1$ and $R_2$ provide a functional moiety for functionalizing the rubber.

In particular embodiments, the peroxide may be a peroxyketal represented by the formula $R_3$—O—O—$R_1$—O—O—$R_2$, wherein $R_3$ may be similar to the description provided above as $R_2$ or in other embodiments similar to the description provided above as $R_1$. When $R_3$ comprises a functional moiety, the functional moiety in particular embodiments may be the same or different than that of $R_2$ and when $R_1$ also comprises a functional moiety, the $R_3$ functional moiety in particular embodiments may be the same or different than that of $R_1$. When neither $R_1$ nor $R_3$ comprise a functional moiety, $R_1$ and $R_3$ may be the same or different.

When mixing the peroxide into the rubber mixture, the amount of peroxide added to the mixture is not particularly limiting and an amount suitable for the given application may be added. However, in particular embodiments of the methods disclosed herein, the amount of peroxide added to the rubber in a mixer may be, for example, between 0.3 phr and 15 phr or alternatively, between 0.3 phr and 10 phr, between 0.3 phr and 7 phr, between 0.3 phr and 5 phr, between 0.2 phr and 3 phr, between 0.5 phr and 10 phr, between 1 phr and 5 phr or between 1 phr and 3 phr. Since the peroxide is often provided in an inert carrier, these amounts of peroxide are of the active peroxide and do not include the inert carrier.

Examples of suitable peroxides include: 2-Propeneperoxoic acid, 3-carboxy-, 1-(1,1-dimethylethyl)ester, (2Z) [CAS#: 1931-62-0], 2-Propeneperoxoic acid, 3-carboxy-, 1-(1,1-dimethylpropyl)ester [CAS#: 206270-26-0], Propaneperoxoic acid, 3-carboxy-, 1-(1,1-dimethylethyl)ester, (2Z); [CAS#: 28884-42-6] and Propaneperoxoic acid, 3-carboxy-, 1-(1,1-dimethylpropyl)ester [CAS#: 136338-62-0]. Such peroxides are available from Arkema, Inc., having offices in Pennsylvania. Such peroxides may be used singly or in combination.

Other examples include carbamoperoxoic acid, 1,1-dimethylethyl ester (9CI) [CAS#: 18389-96-3] having an amine functionality; (tert-butylperoxy)methanol [CAS#: 17742-748-8] having an hydroxyl functionality; 2-(tert-butylperoxymethyl)oxirane [CAS#: 33415-52-0] having an epoxide functionality; silane, [3-[(1,1-dimethylethyl)dioxy]-3-methyl-1-butenyl]triethoxy-, (E)-[CAS#: 147316-37-8] having a triethoxy silane functionality and Butanenitrile, 4-[(1,1-dimethylethyl)dioxy]-[CAS#: 33415-52-0] having a nitrile functionality.

As noted, it has been demonstrated that natural rubber and synthetic polyisoprene rubber can be functionalized using these disclosed in-situ methods. These functionalized rubbers may then be used to form useful articles or alternatively may be mixed with other elastomers not functionalized by these methods to form useful articles, such other elastomers being diene elastomers, which is understood to mean those elastomers resulting at least in part (i.e., a homopolymer or a copolymer) from diene monomers (monomers bearing two double carbon-carbon bonds, whether conjugated or not). Essentially unsaturated diene elastomers are understood to mean those diene elastomers that result at least in part from conjugated diene monomers, having a content of members or units of diene origin (conjugated dienes) that are greater than 15 mol. %.

Thus, for example, diene elastomers such as butyl rubbers, nitrile rubbers or copolymers of dienes and of alpha-olefins of the ethylene-propylene diene terpolymer (EPDM) type or the ethylene-vinyl acetate copolymer type, do not fall within the preceding definition and may in particular be described as "essentially saturated" diene elastomers (low or very low content of units of diene origin, i.e., less than 15 mol. %).

Within the category of essentially unsaturated diene elastomers are the highly unsaturated diene elastomers, which are understood to mean in particular diene elastomers having a content of units of diene origin (conjugated dienes) that is greater than 50 mol. %.

For particular embodiments, the rubber elastomers suitable for use with the functionalized elastomers disclosed herein include highly unsaturated diene elastomers, for example, polybutadienes (BR), polyisoprenes (IR), natural rubber (NR), butadiene copolymers, isoprene copolymers and mixtures of these elastomers. The polyisoprenes include synthetic cis-1,4 polyisoprene, which may be characterized as possessing cis-1,4 bonds at more than 90 mol. % or alternatively, at more than 98 mol. %.

Also suitable for use with the functionalized elastomers are rubber elastomers that are copolymers and include, for example, butadiene-styrene copolymers (SBR), butadiene-isoprene copolymers (BIR), isoprene-styrene copolymers (SIR) and isoprene-butadiene-styrene copolymers (SBIR) and mixtures thereof. Other suitable elastomers include thermoplastic elastomers (TPE) such as styrene-butadiene-styrene (SBS) and styrene-isoprene-styrene (SIS) clock copolymers and thermoplastic olefins (TPO) such as ethylene-butene elastomer and ethylene-octene elastomer.

The methods for functionalizing a rubber pursuant to particular embodiments disclosed herein may include adding the natural rubber or synthetic polyisoprene rubber and an organic peroxide represented by the formula $R_1$—O—O—$R_2$ to a mixer. Such components may be added to the mixer together or the peroxide may be added later after the mixer has run for a period of time and the rubber has softened. Of course other materials may optionally be added, such as a reinforcing filler or resin as may be suitable under the circumstances. Each of such optional materials may be added individually or mixed either when the peroxide is added, before the peroxide is added or after the peroxide is added.

The mixer used may be any suitable mixer, such as an internal mixer or extruder, as long as the mixing is severe enough or the processing conditions such as temperature and rpm are sufficient to raise the temperature of the rubber to an adequate temperature to cause the peroxide to decompose and then react with the rubber. An example of an internal mixer is the Banbury mixer, well known in the rubber industry.

After the peroxide has been added to the mixer, such methods may include mixing the mix composition comprising the synthetic polyisoprene rubber and/or the natural rubber and the organic peroxide until the mix composition reaches a target temperature. The target temperature is at least high enough to decompose the peroxide and to support the reaction of the decomposition product comprising the functional moiety with the rubber. In particular embodiments, for example, the target temperature of the mix composition may be between 120° C. and 190° C. or alternatively, between 130° C. and 180° C., between 140° C. and 170° C. or between 150° C. and 170° C. The target temperature is dependent upon the temperature at which the peroxide decomposes and at which the decomposition product comprising the functional moiety reacts with the rubber, both at a suitably fast rate. Of course the higher the temperature, the faster the rates of reaction. A limit on the temperature is that at which damage to the rubber will occur, which temperature is dependent on the rubber type and the peroxide structure.

Particular embodiments of the methods disclosed herein may therefore include decomposing the organic peroxide to provide a decomposition product comprising the functional moiety and reacting at least a portion of the decomposition product with at least a portion of the diene rubber to produce the functionalized rubber.

After a suitable target temperature has been obtained, particular embodiments of the methods may optionally include stopping and/or slowing the speed of the mixer to maintain the target temperature and holding the mix composition at the target temperature for a set period of time. Such holding may allow more of the peroxide to decompose and may allow more of the decomposition product to react with the rubber, thereby resulting in a higher level of functionalization. Such methods may optionally include, in particular embodiments, cooling the mix composition during the holding period in the event that the target temperature is higher than the desired holding temperature.

Particular embodiments of the methods disclosed herein may further optionally include adjusting the mixing process (e.g., speed, temperature of mixer) so that the mix composition is mixed for and/or reaches the target or a particular range of target temperatures over a set period of time ensuring that the peroxide has time to decompose and the decomposition products have time to react with the rubber at a suitable level over the set period of time.

After suitable processing of the mix composition has been completed in the mixer, particular embodiments of the disclosed methods include removing the mix composition from the mixer, typically by dropping the mix composition from the mixer. In particular embodiments, the method may further include cooling the mix composition, typically on a mill, until the temperature is less than about 100° C. or alternatively, less than about 70° C. or between about 30° C. and 40° C. The cooling mill is typically a two-roll mill and may optionally have cooled mill rolls to provide quicker cooling. Alternatively the material may be cooled with a water bath or a cold table.

After the mix composition has been adequately cooled, the mix composition now comprising a functionalized rubber, may be stored until needed or immediately used as a component in a rubber composition useful for the manufacture of rubber articles, including the manufacture of tire components.

Such rubber compositions useful for the manufacture of rubber articles, in addition to having the mix composition having the functionalized rubber produced in-situ via the methods disclosed above, may include additional rubber components, including a highly unsaturated rubber, an essentially unsaturated rubber, an essentially saturated rubber or combinations thereof, as well as other components. Alternatively, of course, such rubber compositions may only include the functionalized rubber as the rubber component.

Typically rubber compositions useful for rubber articles include a reinforcing filler as is well known in the art. Such reinforcing fillers may include, for example, silica and carbon black. As is known in the art, the functionalization of the rubber often improves the rubber interaction with the reinforcing filler so that the selection of the functional moiety to append to the rubber is often based upon the type of reinforcement that will be included in the rubber composition.

As noted above, silica is a useful reinforcement filler in some rubber compositions having the functionalized rubbers made by the methods disclosed herein. The silica may be any reinforcing silica known to one having ordinary skill in the art including, for example, any precipitated or pyrogenic silica having a BET surface area and a specific CTAB surface area both of which are less than 450 m$^2$/g or alternatively, between 30 and 400 m$^2$/g may be suitable for particular embodiments based on the desired properties of the cured rubber composition. Particular embodiments of rubber compositions disclosed herein may, for example, include a silica having a CTAB of between 80 and 200 m$^2$/g, between 100 and 190 m$^2$/g, between 120 and 190 m$^2$/g or between 140 and 180 m$^2$/g. The CTAB specific surface area is the external surface area determined in accordance with Standard AFNOR-NFT-45007 of November 1987.

Highly dispersible precipitated silicas (referred to as "HDS") may be useful in particular embodiments of such rubber compositions produced by the methods disclosed herein, wherein "highly dispersible silica" is understood to mean any silica having a substantial ability to disagglomerate and to disperse in an elastomeric matrix. Such determinations may be observed in known manner by electron or optical microscopy on thin sections. Examples of known highly dispersible silicas include, for example, Perkasil KS 430 from Akzo, the silica BV3380 from Degussa, the silicas Zeosil 1165 MP and 1115 MP from Rhodia, the silica Hi-Sil 2000 from PPG and the silicas Zeopol 8741 or 8745 from Huber.

When silica is added to the rubber composition, a proportional amount of a silane coupling agent is also added to the rubber composition. The silane coupling agent is a sulfur-containing organosilicon compound that reacts with the silanol groups of the silica during mixing and with the elastomers during vulcanization to provide improved properties of the cured rubber composition. A suitable coupling agent is one that is capable of establishing a sufficient chemical and/or physical bond between the inorganic filler and the diene elastomer; which is at least bifunctional, having, for example, the simplified general formula "Y-T-X", in which: Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica); X represents a functional group ("X" function) which is capable of bonding physically and/or chemically with the diene elastomer, for example by means of a sulfur atom; T represents a divalent organic group making it possible to link Y and X.

Any of the organosilicon compounds that contain sulfur and are known to one having ordinary skill in the art are useful for practicing particular embodiments of the rubber compositions disclosed herein. Examples of suitable silane coupling agents having two atoms of silicon in the silane molecule include 3,3'-bis(triethoxysilylpropyl)disulfide and 3,3'-bis (triethoxy-silylpropyl)tetrasulfide (known as Si69). Both of these are available commercially from Degussa as X75-S and X50-S respectively, though not in pure form. Degussa reports the molecular weight of the X50-S to be 532 g/mole and the X75-S to be 486 g/mole. Both of these commercially available products include the active component mixed 50-50 by weight with a N330 carbon black. Other examples of suitable silane coupling agents having two atoms of silicon in the silane molecule include 2,2'-bis(triethoxysilylethyel)tetrasulfide, 3,3'-bis(tri-t-butoxy-silylpropyl)disulfide and 3,3'-bis(di t-butylmethoxysilylpropyl)tetrasulfide. Examples of silane coupling agents having just one silicon atom in the silane molecule include, for example, 3,3'(triethoxysilylpropyl)disulfide and 3,3'(triethoxy-silylpropyl)tetrasulfide. The amount of silane coupling agent can vary over a suitable range as known to one having ordinary skill in the art. Typically the amount added is between 7 wt. % and 15 wt. % or alternatively between 8 wt. % and 12 wt. % or between 9 wt. % and 11 wt. % of the total weight of silica added to the rubber composition.

Carbon black, which is an organic filler, is well known to those having ordinary skill in the rubber compounding field and may be useful in rubber compositions using the functionalized rubber made by the methods disclosed herein. The carbon black may, in particular embodiments for example, be included in an amount of between 40 phr and 150 phr or alternatively between 50 phr and 100 phr. Other embodiments may include no carbon black or very little carbon black, e.g., less than about 40 phr or even less than about 15 phr.

Suitable carbon blacks are any carbon blacks known in the art and suitable for the given purpose. Suitable carbon blacks of the type HAF, ISAF and SAF, for example, are conventionally used in tire treads. Non-limitative examples of carbon blacks include, for example, the N115, N134, N234, N299, N326, N330, N339, N343, N347, N375 and the 600 series of carbon blacks, including, but not limited to N630, N650 and N660 carbon blacks.

Particular embodiments of the rubber compositions disclosed herein may include no processing oil or very little, such no more than 5 phr. Processing oils are well known to one having ordinary skill in the art, are generally extracted from petroleum and are classified as being paraffinic, aromatic or naphthenic type processing oil, including MES and TDAE oils. Some of the rubber composition so produced may include an elastomer, such as a styrene-butadiene rubber, that has been extended with one or more such processing oils but such oil is limited in the rubber composition as being no more than 10 phr of the total elastomer content of the rubber composition. Other embodiments may use such processing oils and/or other plasticizing materials, such as hydrocarbon resins and vegetable oils, in quantities well known to those having ordinary skill in the art.

The vulcanization system is preferably one based on sulfur and on an accelerator. Use may be made of any compound capable of acting as accelerator of the vulcanization of elastomers in the presence of sulfur, in particular those chosen from the group consisting of 2-mercaptobenzothiazyl disulfide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-tert-butyl-2-benzothiazolesulphenamide (abbreviated to "TBBS"), N-tert-butyl-2-benzothiazolesulphenimide (abbreviated to "TBSI") and the mixtures of these compounds.

Other additives can be added to the rubber compositions useful for the manufacture of rubber articles such as tire components. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide may be added in an amount, for example, of between 1 phr and 6 phr or alternatively, of between 1.5 phr and 4 phr. Waxes may be added in an amount, for example, of between 1 phr and 5 phr.

Such rubber compositions may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., more narrowly between 130° C. and 170° C., is reached.

After cooling of the mixture, a second phase of mechanical working is implemented at a lower temperature. Sometimes referred to as "productive" phase, this finishing phase consists of incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 10 minutes) and at a sufficiently low temperature lower than the vulcanization temperature of the mixture, so as to protect against premature vulcanization.

The rubber composition can be formed into useful articles, including treads and other tire components for use on vehicle tires. Treads, for example, may be formed as tread bands and then later made a part of a tire or they be formed directly onto a tire carcass by, for example, extrusion and then cured in a mold. As such, tread bands may be cured before being disposed on a tire carcass or they may be cured after being disposed on the tire carcass. Typically a tire tread is cured in a known manner in a mold that molds the tread elements into the tread.

Methods for using the functionalized rubber produced by the methods disclosed herein for the in-situ functionalization of rubber are useful. Such methods may include mixing together components of a rubber composition into a non-productive mix, the components comprising the functionalized elastomer produced by the in-situ functionalization methods disclosed herein as well as one or more reinforcement fillers. The reinforcement fillers may be selected from carbon black, silica or combinations thereof.

Such methods may further include cooling the non-productive mix. Such cooling may typically occur on a two-roll mill. After cooling, particular embodiments of such methods may further include mixing a vulcanization system into the non-productive mix to convert the non-productive mix to a productive mix.

Particular embodiments may further include forming the rubber composition of the productive mix into a tire component and curing it. The tire component may be cured with the tire if incorporated into an uncured tire or it may be cured separately from the tire curing if incorporated into a cured tire, as in the case of a retread tire band. Such forming may include, for example, extruding the rubber composition to form a tire tread or other tire component.

The invention is further illustrated by the following examples, which are to be regarded only as illustrations and not delimitative of the invention in any way. The properties of the compositions disclosed in the examples were evaluated as described below.

The maximum tan delta dynamic properties for the rubber compositions were measured at 80° C. on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress at a frequency of 10 Hz under a controlled temperature of 80° C. Scanning was effected at an amplitude of deformation of 0.05 to 50% (outward cycle) and then of 50% to 0.05% (return cycle). The maximum value of the tangent of the loss angle tan delta (max tan $\delta$) was determined during the return cycle.

Example 1

This example illustrates a method for mixing a master batch of natural rubber that was functionalized with a carboxyl moiety. 100 phr of a natural rubber was added to a Banbury mixer with 4.57 phr of the peroxide 2-propeneperoxoic acid, 3-carboxy-, 1-(1,1-dimethylethyl)ester, (2Z) product, which was obtained from Arkema, Inc. of Pennsylvania under the trade name LUPEROX PNP 25. This product, in a paste form, contains 25 wt. % of the peroxide, the remaining 75 wt. % being inactive ingredients so only 25 wt. % of the PNP 25 added to the mixer was active peroxide.

The components were mixed in the Banbury mixer until the temperature of the mixture reached 160° C. The mixture was held at that temperature for five minutes and then dropped. The mixture was transferred to a two-roll mill and processed on the mill for about 3.5 minutes until the temperature of the mixture was less than 100° C. The functionalized mixture was then cut up and used in Example 2.

Example 2

This example illustrates the use of the master batch produced from Example 1 in a rubber composition. Each formulation was prepared with the component amounts shown in Table 1. The witness W1 contained none of the master batch produced in Example 1 while formulations F1-F6 included 20 phr, 60 phr, 80 phr or 100 phr of the functionalized master batch (FMB) as indicated in Table 1.

TABLE 1

| | W1 | F1 | F2 | F3 | F4 | F5 | F6 |
|---|---|---|---|---|---|---|---|
| Formulations and Physical Properties | | | | | | | |
| Components | | | | | | | |
| NR | 100 | 80 | 40 | 40 | 20 | 20 | 0 |
| FMB | 0 | 20 | 60 | 60 | 80 | 80 | 100 |
| Silica | 40 | 40 | 40 | 40 | 40 | 40 | 40 |
| Carbon Black (N234) | 10 | 10 | 10 | 10 | 10 | 10 | 10 |
| Paraffin | 1 | 1 | 1 | 1 | 1 | 1 | 1 |
| Si-69 | 4 | 4 | 4 | 4 | 4 | 4 | 4 |
| Additives | 1.2 | 1.2 | 1.2 | 1.2 | 1.2 | 1.2 | 1.2 |

TABLE 1-continued

| Formulations and Physical Properties | | | | | | | |
|---|---|---|---|---|---|---|---|
| | W1 | F1 | F2 | F3 | F4 | F5 | F6 |
| Vulcanization Pkg. | 10.7 | 10.7 | 10.7 | 10.7 | 10.7 | 10.7 | 10.7 |
| Cured Properties | | | | | | | |
| Tan δ | 0.091 | 0.073 | 0.061 | 0.059 | 0.053 | 0.051 | 0.052 |
| % Improvement | — | 21 | 33 | 35 | 41 | 44 | 44 |

The silica was a highly dispersible silica and the additives included 6PPD, TMQ (a well-known antioxidant) and CTP (a well-known inhibitor). The vulcanization package included sulfur, zinc oxide, stearic acid and accelerators.

For each of the formulations described in Table 1, all the components but for the active vulcanization package were added to a Banbury mixer and mixed until well incorporated. The mixture was then dropped from the Banbury mixer and transferred to a two-roll mill.

The mixture was cooled on the mill and then the remaining components of the vulcanization package were added to the composition and the productive mixture was milled until they were fully dispersed.

For the cured properties, the materials were cured for 25 minutes at 150° C. and then tested for their tan δ properties. The percent improvement in the hysteresis of the rubber compositions having the functionalized master batch range from a 21% improvement to a 44% improvement over the witness composition.

Example 3

A master batch of synthetic polyisoprene rubber was functionalized with a carboxyl moiety using the same procedure as described in Example 1 except using the synthetic polyisoprene rubber rather than a natural rubber. This example illustrates the use of this synthetic polyisoprene rubber master batch in a rubber composition. Each formulation was prepared with the component amounts shown in Table 2. The witness W2 contained none of the synthetic polyisoprene rubber master batch while formulations F7 included 20 phr of the functionalized master batch (FMB) as indicated in Table 2.

TABLE 2

| Formulations and Physical Properties | | |
|---|---|---|
| | W2 | F7 |
| Components | | |
| IR | 100 | 20 |
| FMB | 0 | 80 |
| Silica | 40 | 40 |
| Carbon Black (N234) | 10 | 10 |
| Paraffin | 1 | 1 |
| Si-69 | 4 | 4 |
| Additives | 1.2 | 1.2 |
| Vulcanization Pkg. | 10.7 | 10.7 |
| Cured Properties | | |
| Tan δ | 0.125 | 0.055 |
| % Improvement | — | 56 |

The silica was a highly dispersible silica and the additives included 6PPD, TMQ and CTP. The vulcanization package included sulfur, zinc oxide, stearic acid and accelerators.

For each of the formulations described in Table 2, all the components but for the active vulcanization package were added to a Banbury mixer and mixed until well incorporated. The mixture was then dropped from the Banbury mixer and transferred to a two-roll mill.

The mixture was cooled on the mill and then the remaining components of the vulcanization package were added to the composition and the productive mixture was milled until they were fully dispersed.

For the cured properties, the materials were cured for 25 minutes at 150° C. and then tested for their tan δ properties. The percent improvement in the hysteresis of the rubber composition having the functionalized master batch was 56% over the witness composition.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A method for producing a functionalized rubber, the method comprising:
    adding a diene rubber selected from natural rubber, a synthetic polyisoprene rubber or combinations thereof and an organic peroxide to a mixer, the organic peroxide represented by the formula $R_1$—O—O—$R_2$, wherein $R_1$ is selected from hydrogen or an organic moiety of between 4 and 15 carbon atoms and $R_2$ comprises a functional moiety selected from an amino, an amide, a hydroxyl, a sulfide, an epoxy, a tin-containing, an alkoxysilyl, a silanol, a carbonyl, a carboxyl, a thiocarbonyl, an ammonium, a nitrile, an imine functional moiety or combinations thereof;

mixing a mix composition comprising the diene rubber and the organic peroxide until the mix composition reaches a target temperature of between 120° C. and 190° C.;

decomposing the organic peroxide to provide a decomposition product comprising the carboxyl functional moiety;

reacting at least a portion of the decomposition product with at least a portion of the diene rubber to produce the functionalized rubber;

dropping the mix composition from the internal mixer; and cooling the mix composition.

2. The method of claim 1, wherein $R_2$ is the carboxyl functional moiety.

3. The method of claim 1 or claim 2, wherein the target temperature is between 150° C. and 170° C.

4. The method of claim 1 or 2, further comprising:
adding the peroxide in an amount of between 0.5 phr and 10 phr.

5. The method of claim 4, wherein the peroxide amount is between 1 phr and 5 phr.

6. The method of claim 1, wherein the peroxide is 2-propeneperoxoic acid, 3-carboxy-, 1-(1,1-dimethylethyl)ester, (2Z).

7. The method of claim 1, wherein the peroxide is selected 2-propeneperoxoic acid, 3-carboxy-, 1-(1,1-dimethylpropyl)ester, propaneperoxoic acid, 3-carboxy-, 1-(1,1-dimethylethyl)ester, (2Z) or propaneperoxoic acid, 3-carboxy-, 1-(1,1-dimethylpropyl)ester.

8. The method of claim 1 or 2, wherein the diene rubber is the natural rubber.

9. The method of claim 1 or 2, wherein the diene rubber is the synthetic polyisoprene rubber.

10. The method of claim 1 or 2, further comprising:
holding the mix composition at the target temperature for between 3 and 10 minutes.

11. The method of claim 1 or 2, wherein the mix composition consists essentially of the diene elastomer and the peroxide.

12. The method of claim 1 or 2, wherein the peroxide is represented by the formula $R_3—O—O—R_1—O—O—R_2$, wherein $R_3$ is selected from hydrogen or an organic moiety of between 4 and 15 carbon atoms.

13. The method of claim 12, wherein $R_3$ comprises a carboxyl functional moiety.

14. The method of claim 1, wherein $R_1$ comprises a second functional moiety that is selected from an amino, an amide, a hydroxyl, a sulfide, an epoxy, a tin-containing, an alkoxysilyl, a silanol, a carbonyl, a carboxyl, a thiocarbonyl, an ammonium, a nitrile, an imine functional moiety or combinations thereof.

15. A tire component, the tire component comprising a rubber composition that is based upon a cross-linkable elastomer composition, the cross-linkable elastomer composition comprising, per 100 parts by weight of rubber (phr):
between 5 phr and 100 phr of the functionalized elastomer produced by the method of claim 1 or 2;
between 0 phr and 95 phr of an additional diene elastomer;
a reinforcement filler; and
a vulcanization system.

16. The tire component of claim 14, wherein the reinforcing filler is silica.

17. The tire component of claim 14, wherein the reinforcing filler is selected from carbon black, silica or combinations thereof.

18. A method for manufacturing a tire component, the method comprising:
mixing together components of a rubber composition into a non-productive mix, the components comprising between 5 phr and 100 phr of the functionalized elastomer produced by the method of claim 1 or 2, between 0 phr and 95 phr of an additional diene elastomer and a reinforcement filler;
cooling the non-productive mix;
mixing a vulcanization system into the non-productive mix to convert the non-productive mix to a productive mix; and
forming the tire component from the productive mix.

19. The method of claim 17, wherein the reinforcing filler is silica.

20. The method of claim 17, wherein the reinforcing filler is selected from carbon black, silica or combinations thereof.

* * * * *